United States Patent [19]

Olander

[11] 4,102,865
[45] Jul. 25, 1978

[54] MODERATION OF MANGANESE CHELATE CATALYZED POLYMERIZATION OF PHENOLIC MONOMERS WITH POLYFUNCTIONAL ALKANOLAMINES

[75] Inventor: Walter Karl Olander, Clifton Park, N.Y.

[73] Assignee: General Electric Company, Pittsfield, Mass.

[21] Appl. No.: 753,544

[22] Filed: Dec. 21, 1976

[51] Int. Cl.$^2$ .............................................. C08G 65/44
[52] U.S. Cl. .................................... 528/215; 528/212
[58] Field of Search .................................. 260/47 ET

[56] References Cited

U.S. PATENT DOCUMENTS 3,825,521   7/1974   Izawa et al. ..................... 260/47 ET Primary Examiner—Lester L. Lee
Attorney, Agent, or Firm—Morgan, Finnegan, Pine, Foley & Lee

[57] ABSTRACT

A novel process is disclosed for the moderation of the manganese chelate catalyzed oxidative coupling of a phenolic monomer. The process is based on the addition to the polymerization mixture of a quantity of a polyfunctional alkanolamine that is sufficient to retard the rate of polymerization and permit precise control of the polymerization reaction.

17 Claims, No Drawings

MODERATION OF MANGANESE CHELATE CATALYZED POLYMERIZATION OF PHENOLIC MONOMERS WITH POLYFUNCTIONAL ALKANOLAMINES

This invention is concerned with a process that is useful for the moderation of the manganese chelate catalyzed polymerization of a phenolic monomer by adding to the polymerization mixture, a quantity of a polyfunctional alkanolamine that is sufficient to retard the rate of polymerization and permit precise control of the polymerization reaction.

BACKGROUND OF THE INVENTION

The polyphenylene oxides and methods for their preparation are known in the art and are described in numerous publications, including Hay U.S. Pat. No. 3,306,874 and U.S. Pat. No. 3,306,875. The Hay processes are based on the use of copper-amine complexes. Manganese catalyzed methods for the preparation of polyphenylene oxides are disclosed in McNelis, U.S. Pat. No. 3,220,979; Olander, U.S. Pat. No. 3,956,242; Nakashio, U.S. Pat. No. 3,573,257; and Nakashio, U.S. Pat. No. 3,787,361.

In the applicant's copending applications Ser. No. 491,370, filed July 24, 1974 and Ser. No. 534,903, filed Dec. 20, 1974, there are disclosed novel procedures for polymerizing polyphenylene oxides with complex manganese based catalysts. All of these patents and applications are hereby incorporated by reference.

The procedures employing manganese based catalysts have been based on the oxidative coupling of a phenolic monomer in an appropriate organic solvent. The manganese chelate catalyst is not a self limiting catalyst system and a need has existed for a method which permits precise control of the build stage of the polymerization reaction. The control of the rate of reaction during build stage is important as this can affect the physical properties of articles molded from the polymer. It has now been found that the addition of a polyfunctional alkanolamine at a particular stage of the reaction will provide a means for gradual polymer build over a period of time that does not result in an unduly extended polymerization cycle. The polyfunctional alkanolamines are preferably added when the polyphenylene oxide polymer reaches a I.V. of about 0.2 dl/g as measured in chloroform at 30° C. The use of the polyfunctional alkanolamines is also useful in reliably obtaining polyphenylene oxides of a desired range of intrinsic viscosities when the polymerization is carried out in a pressurized reactor.

In the prior art, ethanolamine, diethanolamine and triethanolamine have been employed as a polyphenylene oxide catalyst component that is complexed with the manganese salt prior to the initiation of the polymerization reaction. Examples of these processes are described in U.S. Pat. No. 3,787,361 and in Komoto et al, Die Makromolekulare Chemie 166 (1973) pp 57–58. These processes fail to suggest that polyfunctional alkanolamines will produce a moderating effect when added to a polyphenylene oxide polymerization reaction after the initial stages of the polymerization reaction have been completed.

Accordingly, it is a primary object of this invention to provide a means for retarding the rate of oxidative coupling in a polyphenylene oxide polymerization reaction which permits the regulation of the build stage of polymerization.

It is also a further object of this invention to provide a method for making manganese chelate catalyzed polymerization of phenolic monomers self-limiting with regard to the final intrinsic viscosity of the polymer.

DETAILED DESCRIPTION OF THE INVENTION

The process of the invention provides an improved method for preparing polyphenylene oxide resins which comprises oxidatively coupling a phenolic monomer under polymer forming reaction conditions to form the polyphenylene oxide resin in the presence of an organic solvent and a manganese chelate catalyst of the formula:

$$(L)_x Mn$$

wherein L is a ligand derived from an $\omega$-hydroxyoxime, Mn is the transition metal manganese and $x$ is at least equal to about 0.5. The improvement comprises adding to the polymerization reaction when the polyphenylene oxide resin has reached an intrinsic viscosity of about 0.2 dl/g as measured in chloroform at 30° C, an amount of a polyfunctional alkanolamine of the formula:

$$R^1_r \text{—N} (\text{—}C_n H_{2n} \text{—OH})_m )_p$$

wherein $R^1$ is hydrogen, straight or branched chain alkylene of from 1 to 6 carbon atoms, alkylenehydroxy of from 2 to 4 carbon atoms, aminoalkylene of from 1 to 6 carbon atoms; $r$ is 0 or 1; $n$ is a whole number of from 2 to 4; $m$ is a whole number of from 1 to 3; and $p$ is the whole number 1 or 2, with the proviso that when $p$ is 2, $m$ is 1, and when $r$ is 1, $m$ is 2. The polyfunctional alkanolamine is employed in an amount that is sufficient to retard the rate of polymerization.

As used hereinabove and in the appended claims the term alkylene is intended to include divalent straight and branched chain hydrocarbon carbon groups that are saturated.

The phenolic monomers are preferably selected from compounds having the formula:

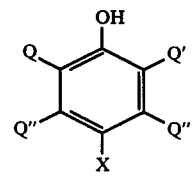

wherein X is a substituent selected from the group consisting of hydrogen, chlorine, bromine and iodine, Q is a monovalent substituent selected from the group consisting of hydrocarbon radicals, halohydrocarbon radicals having at least two carbon atoms between the halogen atom and the phenol nucleus, hydrocarbonoxy radicals and halohydrocarbonoxy radicals having at least two carbon atoms between the halogen atom and the phenol nucleus; and Q' is as defined for Q and in addition may be halogen and Q" are each as defined for Q' and in addition may be hydrogen, with the proviso that Q, Q' and Q" are all free of a tertiary carbon atom.

The preferred phenolic monomer is 2,6-xylenol.

While reference is made hereinafter to manganese (II), it is to be understood that other forms of manganese may be employed such as manganese (VII).

The ligand that is used to form the manganese chelate complex of the formula:

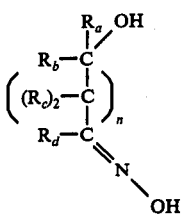

Formula I wherein $R_a$, $R_b$, $R_c$ and $R_d$ are selected from the group consisting of hydrogen, acyclic and cyclic organic radicals and $n$ is a positive integer equal to 0 or 1.

Manganese (II) chelates can be employed in a mono, bis, tris, tetrakis, etc. ligand form wherein one, two, three, four, etc. bidentate ligands, i.e. bidentate ligand being defined as the cyclic ring structure which arises from the union of a manganese (II) atom with a single oxime nitrogen atom and a single hydroxy oxygen atom associated with a single ω-hydroxyoxime ligand forming molecule, are associated with a single Mn(II) atom. Often manganese (II) chelates, preferably, are employed in their bis-bidentate form wherein two cyclic ring structures arise from the union of a single Mn(II) atom with two separate and distinct ω-hydroxyoxime molecules. Illustrative of Mn(II) chelates in mono-bidentate and bis-bidentate form are the chelates described in Formulas II and III, respectively, set out hereafter.

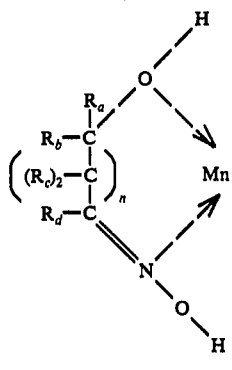

Formula II

, and

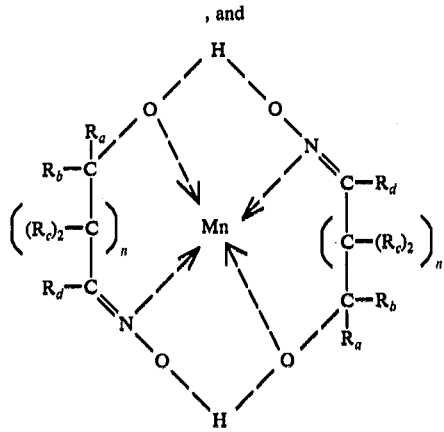

Formula III wherein $R_a$, $R_b$, $R_c$, $R_d$ and $n$ are the same as defined hereinbefore.

The manganese (II) chelates can be prepared by any method known to those skilled in the art which introduces a divalent manganese ion, commonly referred to as Mn(II) or as Mn++, to a hydroxyoxime ligand group, i.e., any appropriate hydroxyaldoxime or ketoxime of the Formula I, or any mixture thereof. In general, any amount of manganese (II) and ω-hydroxyoxime can be combined in the preparation of the Mn (II) chelate, however, an amount sufficient to form a Mn (II) bis-bidentate ligand chelate ring type is preferably employed. The aforesaid aldoxime or ketoxime reactants can be prepared by any method well known to those skilled in the art, such as by the well known reactions of a hydroxylamine with α- or β-hydroxy-substituted aldehyde or ketone, respectively, or by the use of suitable oxime exchange techniques, such as those described in U.S. Pat. No. 3,124,613. In the preparation of the effective Mn (II) chelate, a manganese (II) ion associated with ω-hydroxyoxime donor ligand atoms can be derived from any manganese (II) compound which is at least partially dispersible or soluble in an ω-hydroxyoxime solution. Representative manganese (II) compounds include manganese (II) halides such as manganese (II) chloride (also known as manganous chloride), manganese (II) bromide, manganese (II) iodide, etc., as well as other manganese (II) compounds, such as manganese (II) carbonate, manganese (II) oxalate, manganese (II) sulfate, manganese (II) acetate, manganese (II) nitrate, manganese (II) phosphate, etc., including hydrated forms of such Mn (II) compounds. A preferred manganese (VII) compound is potassium permanganate.

A preferred method of preparing manganese (II) ω-hydroxyoxime chelates comprises the formation of a solution of manganese (II) compound and a ligand forming hydroxyoxime molecule in a suitable solvent, such as methanol or a combination of methanol and an organic solvent such as chlorobenzene, toluene, and xylene, etc., or mixtures thereof.

The possibility of formation of multiple rings, i.e., five- or six-membered chelate rings closely associated with hydrogen bonding is believed — especially with the five-membered chelate rings to markedly increase the stability and effectiveness of Mn(II) chelates in promoting the condensation of a phenol to a polyphenylene oxide.

The $R_a$, $R_b$, $R_c$ and $R_d$ substituents attached to the chelate ring carbon atoms of the manganese (II) ω-hydroxyoxime catalyst — other than hydrogen — can be any acyclic or cyclic organic radical, e.g., alkyl, cycloalkyl, aryl, aralkyl, alkaryl, alkcycloalkyl, cycloalkaryl radicals or combinations thereof, etc., including acyclic and cyclic radicals having electron-releasing constituents, such as amino, i.e—$NH_2$; monoalkylamino, i.e. —$NHR^1$, dialkylamino, i.e.,—$N(R^1)_2$; hydroxy, i.e.—OH; alkoxy, i.e.—$OR^1$, and alkanoate, i.e.—$OOCR^1$, $R^1$ in all cases being an alkyl group. Preferably, the $R_a$, $R_b$, $R_c$ and $R_d$ substituents associated with each five- or six-membered chelate ring is selected from acyclic and cyclic hydrocarbon radicals, more preferably at least one of the $R_b$ or $R_d$ substituents is selected from aromatic radicals, and even more preferably both of the $R_b$ and $R_d$ substituents are selected from aromatic radicals. Preferably, the acyclic and cyclic hydrocarbon radicals contain from about 1 to about 30 carbon atoms. Representative of preferred hydrocarbon radicals are the following: methyl, ethyl, propyl, butyl, cyclobutyl, pentyl, cyclohexyl, cycloheptyl, decyl, eicosyl, triacontyl, phenyl, benzyl, methylbenzyl, α-methylbenzyl, methylphenyl, idphenylmethyl, naphthylxylyl, etc.

Representative of ω-hydroxyoxime ligand forming molecules that can be employed to prepare the Mn (II)

chelates are the following compounds: benzoin oxime, anisoin oxime, paradimethyl-aminobenzoin oxime, furoin oxime, acetoin oxime, 2-methyl-2-hydroxy-butan-3-one oxime (also known as methylhydroxybutanone oxime), ω-hydroxyacetophenone oxime, 2-methyl-2-hydroxy-4-pentanone oxime, 2-phenyl-2-hydroxy-butan-3-one oxime (also known as phenylhydroxybutanone oxime), adipoin oxime, etc.

The preferred ω-hydroxyoxime ligand forming molecule that can be employed to prepare the Mn (II) complex catalyst is benzoin oxime.

The phenolic monomer and the manganese (II) ω-hydroxyoxime chelate are combined in a solvent. Any liquid may be employed as a solvent provided that it is capable of forming a solution of the phenolic compound and the Mn (II) chelate including ketones, hydrocarbons, chlorohydrocarbons, nitroaromatic hydrocarbons, ethers, sulfoxides, etc., subject to the proviso that the solvents do not interfere with the catalyst activity of the Mn (II) chelate in the preparation of the polyphenylene oxide. Since the solvent for the phenol and the Mn (II) chelate does not need to act as a solvent for the polymer, it may be desirable sometimes to use a solvent system, such as toluene, xylene, chlorobenzene, or nitrobenzene or mixtures thereof with a sufficient amount of methanol as a solvent system in order to cause the polymer to precipitate from the reaction medium while permitting lower molecular weight polymers to remain in solution until they form higher molecular weight polymers. The relative proportions of phenol to solvent can vary widely. Generally, presently acceptable economic reaction parameters comprises a mole proportion of phenol: solvent within the range of from about 20:80 to about 5:95. Presently preferred phenol: solvent mole proportions are within the range of from about 15:85 to about 10:90.

In order to carry out the Mn (II) chelate promoted self-condensation of phenol to polyphenylene oxide the self-condensation reaction must be carried out in a basic reaction medium, such as that provided by the presence of a strong alkali metal base, e.g. alkali metal hydroxides, alkali metal alkoxides, etc., or mixtures thereof. Commercially available alkali metal bases which are readily obtained are presently preferred, such as sodium hydroxide, potassium hydroxide, lithium hydroxide, sodium methoxide, etc. It is preferred that anhydrous sodium hydroxide be employed to provide the strong basic reaction environment essential to the polymerization reaction, however, aqueous solutions, e.g. 50 percent, sodium hydroxide can be employed for convenience. The quantity of alkali metal base which is essential to the promotion of the self-condensation reaction can readily be determined without undue experimentation by those skilled in the art. In general, however, suitable phenol: alkali metal base mole ratios are within the range of from about 1:1 to 100:1, preferably from about 40:1 to about 5:1, and even more preferably from about 20:1 to about 10:1. In the preparation of polyphenylene oxide from 2,6-xylenol, optimum overall process reaction conditions, generally, establish the desirability of employing a 2,6-xylenol: alkali metal hydroxide mole ratio within the range of from about 14:1 to about 18:1.

In general, the mole proportions of phenol: Mn (II) chelate can vary widely to provide any desired — including minimum, maximum or optimum — degree of promotion of the reaction rate of phenols to polyphenylene oxide. Although not wishing to limit this invention by any theory, it is believed that the Mn (II) chelate reaction promoter functions as a true catalyst which remains essentially unconsumed or unchanged, e.g. a Mn (II) compound which is neither hydrolyzed nor dissociated due to thermal or other effects into a non-catalytic form during the self-condensation process. Apparently, the reason that the Mn (II) chelate behaves as a true catalyst is due to the unexpected stability of the Mn (II) five- or six-membered ω-hydroxyoxime chelate rings during preparation of the polyphenylene oxides.

It has been found that the Mn (II) chelate catalyst can be employed in very small amounts relative to the amount of phenol reactant while maintaining and often improving the rate of formation of a polyphenylene oxide compared to the rates of polyphenylene oxide formation associated with prior art processes. In general, however, subject to variations in accordance with the type of ω-hydroxyoxime ligand associated with the Mn (II) chelate, reaction rates comparable to those of the prior art can be obtained wherein the phenol to Mn (II) chelate mole ratio is within the range of from as low as about 100:1 to as high as about 3000:1, or even as high as about 6000:1 wherein the reactions are carried out under super atmospheric pressure.

In general, it is preferred that minimum quantities of Mn (II) chelate be employed for economic reasons and to provide a polyphenylene oxide containing a minimum amount of the manganese catalyst residue. Accordingly, it is preferred that the initial reaction media mole ratio of phenol: manganese (II) to be at least about 500:1, more preferably at least 1500:1, and even more preferably at least 3000:1, wherein this process is carried out at atmospheric or subatmospheric pressures.

As used herein and in the appended claims wherein phenol: manganese (II) numerical ratios are described, it is to be understood that the numerical proportions describe the number of moles of phenol relative to the number of atoms of manganese (II) associated with the Mn (II) chelate independent of the chelate form, i.e., mono-bidentate, bis-bidentate, etc.

In general, the reaction temperature employed in the preparation of polyphenylene oxide in the presence of the Mn (II) chelate catalyst can be varied widely. Suitable polymerization temperatures generally fall within the range of from about 0° to about 50° C., preferably within the range of from about 10° to about 40° C., and more preferably within the range of from about 20° to 30° C. since generally optimum self-condensation reaction rates have been found to exist within the 20° and 30° C temperature range. Mn (II) chelates having strong electron-releasing constituents, e.g. dialkylamino radicals attached to $R_a$, $R_b$, $R_c$ or $R_d$ aromatic substituent of Formulas II or III promote optimum reaction rates at temperatures at or above 35° C. Because the self-condensation reactions are exothermic in nature and the Mn (II) chelates are susceptible to thermal deactivation, it is generally desirable to program the addition of the phenolic monomeric reactant, and in some instances the Mn (II) chelate catalyst, during their initial contact within the reaction media. This programmed addition permits a suitable reaction temperature profile to be obtained whereby the reaction is maintained within a temperature range suited to optimum catalyst efficiency and optimum yields of polyphenylene oxide resin. In general, more latitude with regard to the upper limits of the reaction temperature range can be obtained wherein the process is carried out at superatmospheric pressures, e.g., 1 to 40 psig, 1 to 1000 psig, or even higher pressures. In the event that the self-condensation reaction is discontinued or interrupted due to deactivation of the Mn (II) chelate at elevated temperatures, the reaction can be resumed in a normal fashion by reducing the temperatures of reaction medium and adding thereto additional manganese (II) chelate catatyst in the amounts required to initiate and maintain the desired catalyst efficiency.

The polyfunctional alkanolamines are added to the reaction mixture at the beginning of the build stage of the polymerization reaction. The term "build stage" is used to define the phase of the reaction which occurs often oligomers have formed from the monomer but before high polymer has been produced. While the build stage is not susceptible of a precise mathematical definition, for practical purposes, it may be defined as that stage of the reaction wherein the polyphenylene oxide polymer has an intrinsic viscosity of about 0.15 to 0.4 dl/g as measured in chloroform at 30° C. Generally, it is preferred to add from 0.005 to 0.5 moles of polyfunctional alkanolamine per mole of phenolic monomer in the practice of the present invention.

The preferred polyfunctional alkanolamines are di-ethanolamine; tri-ethanolamine; N,N'-di-ethanolethylenediamine; and 2-(2-amino-ethylamino) ethanol.

The polymerization reaction is carried out by passing a stream of oxygen into the reactor at ambient temperatures at a rate that is adequate to provide sufficient oxygen to be in excess over that which is absorbed while vigorously stirring the solution. The manganese chelate catalyst solution is then added to the phenolic monomer solution. A 50% aqueous sodium hydroxide solution taken up in methanol is added to the reactor in an amount which is equal to about 4 weight percent of the phenol.

After initiation of the polymerization reaction, the reaction is regulated by the rate of addition of the phenol reactant portion from the pump reservoir to the reactor in order to provide a controllable exotherm so that the temperature does not exceed substantially 45° C.

Typically a 50 wt. % solution of the phenol in the polymerization solvent e.g., toluene, chloroform, etc. is prepared. About one-sixth of the monomer is added directly to the reactor and the remaining five-sixths is added over the initial 40 minutes of the reaction. When a polyphenylene oxide intrinsic viscosity of about 0.50 dl/g as measured in chloroform at 30° C, is obtained, the reaction may be neutralized with acetic acid and then terminated by the addition of an antisolvent. The antisolvents are well known and include lower alkanols having 1-8 carbon atoms. The preferred antisolvent is methanol.

The antisolvent may be added directly to the polymerization reaction mixture to precipitate the polyphenylene ether resin along with the manganese chelate catalyst. The alkali activated manganese chelate catalyst is soluble in the typical organic reaction solvent such as toluene while it is insoluble in the typical antisolvent such as methanol. If desired the polymerization may be terminated by rapidly heating the reaction mixture to the deactivation temperature of the catalyst, i.e. above 50° C.

DESCRIPTION OF THE PREFERRED EMBODIMENTS

The following examples illustrate the process of this invention. They are merely illustrative and are not to be construed to limit the invention in any manner whatsoever.

EXAMPLE I

A polymerization was carried out with the following materials:

| | | |
|---|---|---|
| 2,6 - xylenol | 500 | g. (4.098 moles.) |
| methanol | 300 | g. |
| toluene | 1700 | g. |
| sodium hydroxide | 20.0 | g. (50% aq.) |
| manganese (II) chloride | 0,42 | g. (0.00327) |
| benzoin oxime | 1.56 | g. (0.00655 mole.) |

The catalyst is prepared by dissolving the manganese chloride and benzoinoxime in about 50 g. of methanol. The catalyst is added to the oxygenated reaction mixture containing the base, remaining methanol, one-sixth of the 2,6-xyenol (c.83g) and most of the toluene. The remaining 2,6-xylenol as a 50 weight percent solution in toluene is added at a uniform rate over the first 40 minutes of the polymerization. The one gallon Chemco reactor is employed in the reaction and stirring is maintained at 375 r.p.m. The temperature was about 80° initially and rose to about 90° F for 50 minutes and dropped to about 84°-86° F thereafter. After 60 minutes of polymerization the I.V. was 0.22 dl/g as measured in CHCl$_3$ at 30° C and 6.73 g. of diethanolamine was added. The polymer build was suppressed and a poly (2,6-dimethyl-1,4-phenyleneoxide) having desirable molecular weight was obtained gradually. The I.V. was 0.52 dl/g at 80 minutes as measured in CHCl$_3$ at 30° C and was 0.58 dl/g as measured in CHCl$_3$ at 100 minutes.

This polymerization was repeated and the second run employed the following reaction compositions:

| | | |
|---|---|---|
| 2,6 - xylenol | 600 | g |
| methanol | 360 | g |
| toluene | 2040 | g |
| sodium hydroxide (50% aqueous) | 24 | g |
| manganese chloride (97%) | 0,51 | g |
| benzoin oxime (96%) | 1.88 | g |

The reaction was carried out according to the method described hereinabove and after 60 minutes the I.V. was 0.17 dl/g as measured in CHCl$_3$ at 30° C. At this point 8.08 g. of diethanolamine was added and the polymerization was continued. After 80 minutes, the I.V. was 0.32 dl/g as measured in CHCl$_3$ at 30° C and after 100 minutes, the I.V. was 0.52 dl/g as measured in CHCl$_3$ at 30° C.

COMPARATIVE EXAMPLE 1

The general procedure of Example 1 was repeated, except that di-ethanolamine was not employed. The reaction was characterized by a rapid molecular weight increase from 60 – 90 minutes which resulted in a final product possessing too great a viscosity for practical molding use.

| TIME (minutes) | INTRINSIC VISCOSITY (dl/g in CHCl$_3$ at 30° C) |
|---|---|
| 60 | 0.24 |
| 75 | 0.81 |
| 90 | 1.25 |
| 100 | 1.25 |

EXAMPLE 2

The general procedure of the first run of Example 1 was repeated using 500 g. 2,6 xylenol except that 9.26 g. of the tri-ethanolamine was added at 60 minutes into the polymerization. The polymer build was moderated similarly to that in Example 1.

| TIME (minutes) | INTRINSIC VISCOSITY (dl/g in CHCl$_3$ at 30° C) |
| --- | --- |
| 60 | 0.19 |
| 80 | 0.32 |
| 100 | 0.50 |

COMPARATIVE EXAMPLE 2

The general procedure and quantities of the first run of Example 1 was repeated except that 14.66 g of N,N',N'',N'''-tetraethanolethylenediamine was added at 60 minutes. No moderation occurred over the next 15 minutes and high molecular weight polymer was obtained.

| TIME (minutes) | INTRINSIC VISCOSITY (dl/g in CHCl$_3$ at 30° C) |
| --- | --- |
| 60 | 0.23 |
| 75 | 0.79 |

The failure of the N,N',N'',N'''-tetraethanolethylenediamine to moderate the polymerization is unexpected and unexplained.

Although the above examples have shown various modifications of the present invention, other variations are possible in light of the above teachings. It is, therefore, to be understood that changes may be made in the particular embodiments of the invention described which are within the full intended scope of the invention as defined by the appended claims.

I claim:

1. In a process for the preparation of a polyphenylene oxide resin which comprises the step of oxidatively coupling a phenolic monomer to form a polyphenylene oxide resin in the presence of an organic solvent and a manganese (II) chelate catalyst of the formula

wherein L is a ligand derived from an ω-hydroxyoxime in a conventional manner, Mn is the transition metal manganese (II) and x is at least equal to about 0.5; the improvement which comprises adding, at a point in the reaction when the polyphenylene oxide resin has reached an intrinsic viscosity of about 0.15 dl/g, as measured in chloroform at 30° C., a sufficient amount to retard the rate of reaction of a polyfunctional alkanolamine of the formula:

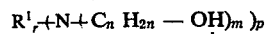

wherein R$^1$ is hydrogen, straight or branched chain alkylene of from 1 to 6 carbon atoms, alkylenehydroxy of from 2 to 4 carbon atoms, aminoalkylene of from 1 to 6 carbon atoms; r is 0 or 1; n is a whole number of from 2 to 4; m is a whole number of from 1 to 3; and p is the whole number 1 or 2, with the proviso that when p is 2, m is 1, and r is 1, m is 2.

2. The process of claim 1 wherein the phenolic monomer is selected from compounds having the formula:

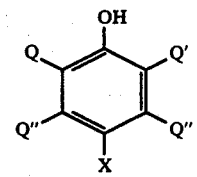

wherein X is a substituent selected from the group consisting of hydrogen, chlorine, bromine and iodine, Q is a monovalent substituent selected from the group consisting of hydrocarbon radicals, halohydrocarbon radicals having at least two carbon atoms between the halogen atom and the phenol nucleus, hydrocarbonoxy and halohydrocarbonoxy radicals having at least two carbon atoms between the halogen atom and the phenyl nucleus; and Q' is as defined for Q and in addition may be halogen and Q'' are each as defined for Q' and in addition hydrogen, with the proviso that Q, Q' and Q'' are all free of a tertiary carbon atom.

3. The process of claim 2 wherein the ligand of the manganese (II) chelate complex is of the formula:

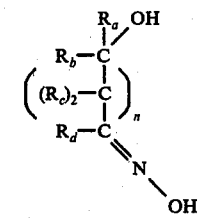

wherein R$_a$, R$_b$, R$_c$ and R$_d$ are selected from the group consisting of hydrogen, acyclic and cyclic organic radicals and n is a positive integer equal to 0 or 1.

4. The process of claim 3 wherein the oxidative coupling is carried out in the presence of a secondary alkanolamine.

5. The process of claim 4 wherein the phenolic monomer is 2,6-xylenol.

6. The process of claim 5 wherein the manganese (II) chelate complex is manganese benzoin oxime.

7. The process of claim 5 wherein the polyfunctional alkanolamine is diethanolamine.

8. The process of claim 5 wherein the polyfunctional alkanolamine is triethanolamine.

9. The process of claim 5 wherein the polyfunctional alkanolamine is N,N'-di-ethanolethylenediamine.

10. The process of claim 5 wherein the polyfunctional alkanolamine is 2-(2-amino-ethylamino) ethanol.

11. In a process for the preparation of a polyphenylene oxide resin which comprises the step of oxidatively coupling a phenolic monomer in the presence of oxygen to form a polyphenylene oxide in the presence of an organic solvent and a manganese (II) chelate complex of the formula

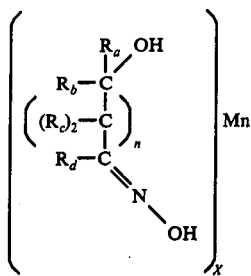

wherein $R_a$, $R_b$, $R_c$ and $R_d$ are selected from the group consisting of hydrogen, acyclic and cyclic organic radicals and $n$ is a positive integer equal to 0 or 1, Mn is the transition metal manganese (II) and $x$ is at least equal to 0.5; the improvement which comprises adding at a point in the reaction when the polyphenylene oxide resin has reached an intrinsic viscosity between 0.15 and 0.4 dl/g. as measured in chloroform at 30° C, a sufficient amount to retard the rate of reaction of a polyfunctional alkanolamine of the formula:

$$R^1_r(N(C_nH_{2n}-OH)_m)_p$$

wherein $R^1$ is hydrogen, straight or branched chain alkylene of from 1 to 6 carbon atoms, alkylenehydroxy of from 2 to 4 carbon atoms, aminoalkylene of from 1 to 6 carbon atoms; $r$ is 0 or 1; $n$ is a whole number of from 2 to 4; $m$ is a whole number of from 1 to 3; and $p$ is the whole number 1 or 2, with the proviso that when $p$ is 2, $m$ is 1, and when $r$ is 1, $m$ is 2.

12. The process of claim 11 wherein from 0.005 to 0.5 mole of polyfunctional alkanolamine per mole of phenolic monomer is added to the reaction.

13. The process of claim 12 wherein the phenolic monomer is 2,6-xylenol.

14. The process of claim 13 wherein the polyfunctional alkanolamine is di-ethanolamine.

15. The process of claim 13 wherein the polyfunctional alkanolamine is tri-ethanolamine.

16. The process of claim 13 wherein the polyfunctional alkanolamine is N,N'-di-ethanolethylenediamine.

17. The process of claim 13 wherein the polyfunctional alkanolamine is 2-(2-amino-ethylamino) ethanol.

* * * * *